(12) United States Patent
De Cooman et al.

(10) Patent No.: US 7,754,100 B2
(45) Date of Patent: Jul. 13, 2010

(54) SURFACE TREATMENT AGENT FOR ORGANIC POLYMER SUBSTRATES OF POLYMERIZABLE AEROBIC (METH)ACRYLATE SYSTEMS

(75) Inventors: Ria De Cooman, Arni (CH); René Flury, Basel (CH); Daniel Flury-Schäfer, legal representative, Riehen (CH)

(73) Assignee: Sika Technology AG, Baar (CH)

( * ) Notice: Subject to any disclaimer, the term of this patent is extended or adjusted under 35 U.S.C. 154(b) by 1266 days.

(21) Appl. No.: 10/499,027

(22) PCT Filed: Dec. 14, 2002

(86) PCT No.: PCT/EP02/14270

§ 371 (c)(1),
(2), (4) Date: Aug. 4, 2005

(87) PCT Pub. No.: WO03/052002

PCT Pub. Date: Jun. 26, 2003

(65) Prior Publication Data

US 2006/0068147 A1    Mar. 30, 2006

(30) Foreign Application Priority Data

Dec. 17, 2001   (EP) ................... 01129932

(51) Int. Cl.
*C09K 3/00* (2006.01)
(52) U.S. Cl. ............... 252/182.13; 252/182.12; 252/182.11
(58) Field of Classification Search ............ 252/182.11, 252/182.13
See application file for complete search history.

(56) References Cited

U.S. PATENT DOCUMENTS

| | | | | |
|---|---|---|---|---|
| 3,619,393 A | * | 11/1971 | Stahly | ............ 522/18 |
| 4,044,044 A | * | 8/1977 | Saito | ............ 526/278 |
| 4,515,930 A | * | 5/1985 | Omura et al. | ............ 526/276 |
| 4,731,146 A | | 3/1988 | Clark | |
| 5,028,661 A | * | 7/1991 | Clark et al. | ............ 525/189 |
| 6,265,508 B1 | | 7/2001 | Nakayama | |

FOREIGN PATENT DOCUMENTS

| | | |
|---|---|---|
| JP | A 1-297482 | 11/1989 |
| JP | A 7-277913 | 10/1995 |

OTHER PUBLICATIONS

Paul J. Clark; "Bond Durability: The Influence of Surface Reactions"; 1988 Fall Technical Mini-Seminar Nov. 2; The Adhesive and Sealant Council, Inc.; pp. 27-37.
G. Habenicht; "Kleben" (Adhesives); Springer Verlag, Berlin; 1997; p. 615 (with translation).

* cited by examiner

*Primary Examiner*—Mark Eashoo
*Assistant Examiner*—Peter F Godenschwager
(74) *Attorney, Agent, or Firm*—Oliff & Berridge, PLC

(57) ABSTRACT

The invention relates to surface treating agents for aerobic (meth)acrylate systems, which comprise one or more solvents, one or more (meth)acrylate monomers of the formula (A), wherein $R=H$ or $CH_3$ and $m=1-3$, $p=3-m$ and $n=1-5$, with m, p, and n being an integer, and one or more substances of formula (B), wherein R1, R2 and R3 are H, alkyl, cycloalkyl, aryl, alkylaryl, alkenyl or halogen and R4 is H, methyl or ethyl. The invention further relates to a surface treating agent for aerobic (meth)acrylate systems, which comprises one or more solvents, one or more (meth)acrylate monomers of the formula (A), one or more substances of the formula (B), and one or more additional (meth)acrylate monomers that are devoid of phosphorous functional groups. The invention also describes articles whose surface consists, at least in the boundary zone, of organic polymers and that were pretreated with the inventive surface treating agents.

21 Claims, No Drawings

SURFACE TREATMENT AGENT FOR ORGANIC POLYMER SUBSTRATES OF POLYMERIZABLE AEROBIC (METH)ACRYLATE SYSTEMS

TECHNICAL FIELD

The invention relates to a surface treatment agent to improve adhesion of aerobic (meth)acrylate systems to organic polymer substrates.

PRIOR ART

Reactive systems based on (meth)acrylates have important advantages. In particular, extremely rapidly reacting systems can be formulated and they also generally have a very good adhesive range. Such reactive systems are used in many different ways as adhesives, sealants, varnishes, and other coating agents. However, it seems that adhesion to organic polymers, in particular polyamide substrates, is often problematic.

Silanes are often used on glass and metals to improve adhesion of epoxy and polyurethane adhesives and coatings. As an example of this, we may mention work by Plueddemann (Plueddemann E. P. in "Silane Coupling Agents," Plenum Press, New York, 1991, and Plueddemann E. P. in "Silanes and Other Coupling Agents," Mital K. L., ed., VSP, Utrecht, 1992).

In studies of fracture surfaces, Clark (1988 Fall Technical Mini-Seminar, November 2, Hyatt Regency Dearborn, Dearborn, Mich./ASC, The Adhesive and Sealant Council, Inc., Washington D.C., pp. 27-37) describes the advantageous application of methacryloxyethyl phosphate and bis(methacryloxyethyl phosphate) as primers for zinc, aluminum, and steel for anaerobic methacrylate adhesives.

A primer for anaerobic adhesives is also described by U.S. Pat. No. 4,731,146, where Cu(II), Co(II), Mn(II), Mn(III), or Cr(III) salts of an acid phosphate monomer are contained in a volatile solvent.

The anaerobic (meth)acrylate systems described have the major disadvantage that they are suitable only for very small layer thicknesses, typically films. When applied as a thicker layer, in comparison, such adhesives have poor mechanical properties and consequently very poor adhesion and [sic].

In order to improve adhesion of (meth)acrylate adhesives to precious metals, U.S. Pat. No. 6,265,508 describes a surface treatment solution which, in addition to a polymerizable phosphoric acid ester monomer, also contains a polymerizable thiophenecarboxylic acid ester monomer.

Certain solvents can be used by themselves for bonding organic polymers. For example, poly(methyl methacrylate) parts treated with methylene chloride can be bonded together by contact and pressure. This method for bonding certain polymers, known as diffusion bonding, is however quite limited and has major disadvantages. Since no adhesive is used, the parts must be made to fit each other exactly. In addition, this bonding works only with solvents that are quite soluble in the organic polymer, which also means that after bonding, a considerable amount of solvent is present in the polymer, especially at the adhesive interface, leading to local weakening of the mechanical properties of the polymer. Furthermore, a very long time is required before the adhesive bond achieves its final strength. Finally, the solvents used are undesirable for environmental and occupational hygiene reasons.

G. Habenicht ("Kleben [Adhesives]," Springer Verlag, Berlin, 1997, p. 615) recommends concentrated formic acid or a formic acid/polyamide solution as a pretreatment method to improve adhesion to polyamides. But this pretreatment has considerable limitations with regard to both stability and occupational safety.

(Meth)acrylate systems are known that are called anaerobic. These are 1-component systems that polymerize only when oxygen is excluded and they are in contact with metal surfaces. An example of the application of such systems is to secure screws.

Two-component systems are defined as aerobic (meth)acrylate systems where, in addition to the (meth)acrylate monomers or mixtures thereof present in at least one component, one component contains at least one radical initiator, typically a peroxide, and the other component contains at least one accelerator. In contrast to anaerobic systems, thick-layer bonds, coatings, and seals can be achieved with these systems.

DESCRIPTION OF THE INVENTION

The aim of this invention is therefore to overcome the described disadvantages and problems of surface treatment agents for organic polymers. It was unexpectedly discovered that the disadvantages of the prior art can be eliminated by the surface treatment agent according to the invention, as specified by claim 1 or claim 2. In particular, by means of the surface treatment agent for organic polymers according to the invention, excellent adhesion of aerobic (meth)acrylate systems to polymers can be achieved, so that the bond between a (meth)acrylate system and a polymer breaks mainly cohesively within the (meth)acrylate system. The surface treatment agent has proven to be especially suitable for polyamides.

This invention relates to a surface treatment agent for aerobic (meth)acrylate systems including one or more solvents as well as one or more (meth)acrylate monomers of formula A, as well as one or more substances of formula B, or consisting of one or more solvents, one or more (meth)acrylate monomers of formula A, one or more substances of formula B, as well as one or more additional (meth)acrylate monomers that have no phosphorus-containing functional groups. Preferred solvents are selected from the group of chlorinated hydrocarbons, esters, alcohols, and ketones with boiling points <130° C. Acetone and isopropanol are particularly suitable. Particularly suitable variants of the (meth)acrylate monomers as specified by formula A have proven to be 2-methacryloyloxyethyl phosphate, bis(2-methacryloyloxyethyl)phosphate, as well as tris(2-methacryloyloxyethyl)phosphate, or mixtures thereof. Particularly suitable variants of the substances as specified by formula B have proven to be derivatives of resorcinol as well as monoalkyl ethers thereof.

EMBODIMENT OF THE INVENTION

This invention relates to a surface treatment agent for aerobic (meth)acrylate systems including one or more solvents as well as one or more (meth)acrylate monomers of formula A, as well as one or more substances of formula B, or consisting of one or more solvents, one or more (meth)acrylate monomers of formula A, one or more substances of formula B, as well as one or more additional (meth)acrylate monomers that have no phosphorus-containing functional groups:

A: [1st display formula on German p. 4]
  with R=H or $CH_3$, m=1-3, p=3-m, and n=1-15.
B: [2nd display formula on German p. 4]
  wherein R1, R2 and R3 are each H, alkyl, cycloalkyl, aryl, alkylaryl, alkenyl, or halogen and R4=H, methyl, or ethyl.

The solvent used has a boiling point <130° C. under standard conditions. Preferably a solvent with boiling point <100° C., particularly preferably <90° C., is used. Suitable solvents are, for example, chlorinated hydrocarbons such as methylene chloride, 1,2-dichlorethane, 1,2-dichlorethane, 1,1,1-trichlorethane, or trichlorethylene, esters such as butyl acetate, propyl acetate, ethyl acetate, ethyl formate, or butyl formate, alcohols such as methanol, ethanol, n-propanol, isopropanol, or butanol, and also alkoxy alcohols such as alkoxy propanol, ethylene glycol monomethyl ether, ethylene glycol diethyl ether, or propylene glycol monomethyl ether, and ketones such as diethyl ketone, methyl ethyl ketone or methyl propyl ketone. Isopropanol and acetone have proven to be especially suitable.

The surface treatment agent according to the invention contains (meth)acrylate monomers of formula A A: [display formula on German p. 5]

Here the radical R represents an H or a methyl group, where the methyl group is preferred. The monomers include molecules with n from 1 to 15, preferably molecules with n from 1 to 3. Examples of this are 2-(meth)acryloyloxyethyl phosphate, 4-(meth)acryloyloxybutyl phosphate, 6-(meth)acryloyloxyhexyl phosphate, 8-(meth)acryloyloxyoctyl phosphate, 10-(meth)acryloyloxydecyl phosphate, 16-(meth)acryloylhexadecyl phosphate. Molecules with n=1 are preferred.

All possible combinations corresponding to the indices m=1-3 and p=0-2 are conceivable, where at least one (meth)acrylate radical must be present. Preferred monomers are 2-methacryloyloxyethyl phosphate, bis(2-methacryloyloxyethyl)phosphate, as well as tris(2-methacryloyloxyethyl)phosphate. Traces of phosphoric acid, of course, may also be present as an impurity from the preparation of these monomers.

In certain cases, other (meth)acrylate monomers may also be present which have no phosphorus-containing functional groups. In particular, these are monomers selected from the group of trimethylolpropane triacrylate as well as ethoxylated and propoxylated (meth)acrylates. The ethoxylated and propoxylated (meth)acrylates can contain one or more (meth)acrylate groups, where one to three such groups are preferred. Especially preferred are ethoxylated trimethylolpropane triacrylate, propoxylated neopentyl glycol di(meth)acrylate, as well as ethoxylated ethyl (meth)acrylate, for example 2-(2-ethoxyethoxy)ethyl acrylate. (Meth)acrylate monomers of formula A are usually commercially supplied as a mixture with such (meth)acrylate monomers.

These (meth)acrylate monomers, which have no phosphorus-containing functional groups, may be present in a concentration of 0-20 wt. %, in particular 0-10 wt. %, calculated on the basis of the total formulation.

A preferred embodiment of the surface treatment agent contains (meth)acrylate monomers of formula A in a concentration of 1-10 wt. %, particularly preferably 2-7 wt. %, calculated on the basis of the total formulation.

The surface treatment agent according to the invention contains substances of formula B:

B: [display formula on German p. 6]

The radicals R1, R2 and R3 represent H, alkyl cycloalkyl [sic, should be alkyl, cycloalkyl], aryl, alkenyl, or halogen, and R4=H, methyl, or ethyl. R1 and R2 and R3 can each be individually different, or any two may be identical, or all three may be identical. The substituents R1, R2, and R3 can certainly also be connected with each other by a bridge and can be saturated, unsaturated, or aromatic in nature, such as for example for 1,3-dihydroxynaphthalene or 1,3-dihydroxy-5,6,7,8-tetrahydronaphthalene. In another preferred variant, the substituents represent R1=R3=H and R2=H or alkyl, in particular H or alkyl with chain lengths from C1 to C12. Monomethyl ethers are particularly preferred. Resorcinol (1,3-dihydroxybenzene) has proven to be particularly suitable (R1=R2=R3=R4=H).

The substances of formula B can be present alone or as a mixture in the surface treatment agent. Calculated on the basis of the total formulation, the concentration of the substance specified by formula B is 1-10 wt. %, preferably 2-7 wt. %.

A preferred embodiment of the surface treatment agent can contain organosilicon compounds. These include compounds of formula C $$C: X\text{—}Si(OM)_a X'_b$$

with M=methyl or ethyl, X=C1-C18 alkyl, C1-C18 alkylene, 3-(meth)acryloyloxypropyl, (meth)acryloyloxyalkylpropyl, or 3-glycidyloxypropyl 3-mercaptopropyl [sic, probably should be 3-glycidyloxypropyl, 3-mercaptopropyl], X'=H or CH3, and a=1-3 and b=3-a. The compounds vinyltrimethoxysilane, vinyltriethoxysilane, 3-(meth)acryloyloxypropyltrimethoxysilane, 3-(meth)acryloyloxypropyltriethoxysilane, 3-mercaptopropyltrimethoxysilane, and 3-mercaptopropyltriethoxysilane are preferred.

The organosilicon compound content is preferably 0-2 wt. %, particularly 0-1 wt. %, calculated on the basis of the total formulation.

A preferred embodiment of the surface treatment agent can also contain processing aids well known to those skilled in the art, such as additives and fillers.

The invention additionally relates to an article for which the surface is made of organic polymers, at least in the area of the bond, and which has been pretreated with a surface treatment agent described above. The article can be made entirely of organic polymers or alternatively can be coated with organic polymers or be bonded adhesively or otherwise. The term "organic polymer" here includes polymers and copolymers as well as blends of epoxy resins, carbonates, (meth)acrylates, acrylonitrile, styrene, vinyl chloride, butadiene, esters, and amides. Polyamides are preferred, in particular Polyamide 6, Polyamide 6.6, Polyamide 11, and Polyamide 12, as well as mixtures thereof.

Improved adhesion can also possibly be achieved on certain metal substrates using the surface treatment agent. The surface treatment agent has proven to be especially suitable for galvanized and zinc-plated steel.

The surface treatment agent is applied to the article. It can be applied by spraying, dipping, or wiping with wetted carrier materials such as cloths, cotton wads, rollers, brushes, sponges, and the like. The surface treatment agent should be applied at least in the area where the adhesive or sealant is to be subsequently applied. In order to achieve the best possible adhesive bond, the surface treatment agent should be applied as completely and uniformly as possible to the surfaces to be bonded. A certain time interval elapses between application of the surface treatment agent and application of the adhesive or sealant, during which time the solvent can evaporate. Too short an open time must be avoided, since excess solvent has a negative effect on the mechanical properties of the adhesive or sealant. The open time for the surface treatment agent according to the invention is typically between 30 seconds and a few hours. After the surface treatment agent has air-dried, an aerobic adhesive or an aerobic sealant is applied to the latter by a method well known to those skilled in the art.

Two-component systems are defined as aerobic (meth) acrylate systems where, in addition to the (meth)acrylate monomers or mixtures thereof present in at least one component, one component contains at least one radical initiator, typically a peroxide, and the other component contains at least one accelerator. In contrast to anaerobic systems, these systems enable thick-layer bonds, coatings, and seals.

Such aerobic adhesives and sealants are two-component. Acrylate and/or methacrylate monomers or mixtures thereof can be present in both components. But it is also quite possible that they are present in only one component. At least one accelerator is present in one component and at least one radical initiator, usually a peroxide, is present in the second component. Both components are mixed before use.

An adhesive is applied to the air-dried surface treatment agent and is then bonded to at least one other article. If the surface of that article is also made of organic polymers, it is advantageous for that surface to be pretreated with the surface treatment agent at least in the area of the bond. If the surface of the other article is not made of organic polymers, then such pretreatment can be optionally omitted. Alternatively, however, another type of surface treatment may then be necessary for this purpose.

In an application as a sealant, an opening in one article or between several articles is to be sealed in such a way that after polymerization of the sealant, inlet or outlet of liquids or gases through the articles is prevented. If the surface of the other article is also made of organic polymers, it is advantageous for it to also be pretreated with the surface treatment agent at least in the area of the bond. If the surface of the other article is not made of organic polymers, then such pretreatment can be optionally omitted, or else another type of surface treatment may be necessary for this purpose.

EXAMPLES

Composition of Examples of the Surface Treatment Agent

The following compositions were prepared, based on isopropanol and the adhesion promoter Sartomer SR 9050 (commercial mixture of a 50% solution of formula A in a (meth) acrylate, available from Sartomer/Cray Valley) as well as a substance as specified by formula B:

Substrates

The following substrates, commercially available from Rocholl (Germany), were used:
Polyamide 6: 100×25 mm, 4 mm thick
Polyamide 6.6: 100×25 mm, 4 mm thick
Polyamide 11: 100×25 mm, 3 mm thick
Polyamide 12: 100×25 mm, 4 mm thick Surface Treatment Agent—Application The surface treatment agent was applied to the polymer. Isopropanol was used as the reference. The time between application of the surface treatment agent and the adhesive was at least 30 seconds.

Adhesive

All measurements were used [sic, should be made] with the adhesive SikaFast® 5211 (commercially available from Sika AG, Switzerland). This is a fast-curing and flexible 2-component adhesive, where component A essentially consists of (meth)acrylate monomers and component B consists of a peroxide. The adhesive was premixed using a cartridge gun, mixed with a static mixer, and applied.

Preparation of Test Pieces

Tensile shear strength test pieces were made as specified by DIN EN 1465 from two pieces of polymer. The overlap was 12.5 mm; the adhesive layer thickness was 1.5 mm.

Testing

The tensile shear strength was measured on a Zwick tester with a pull rate of 10 mm/min according to DIN EN 1465, about one day after application of the adhesive.

For measurements after poultice treatment, the test pieces were wrapped in a moist cloth and placed in a plastic bucket additionally containing an open vessel filled with water. The bucket was tightly sealed and stored for 7 days at 70° C. Then the test pieces were removed from the moist cloth, their surfaces were dried off with a paper towel, and they were cooled down at room temperature and tested within a day.

Results

The results are compiled in Table 2, showing the effect of the surface treatment agent at room temperature on the tensile shear strengths. Note on the one hand the effect of the surface treatment agent on the improvement of adhesion and on the other hand the improvement of the fracture pattern, especially after poultice storage.

TABLE 1

Surface treatment agent compositions

| Name | Compositions in wt. % | | | | | | |
|---|---|---|---|---|---|---|---|
| | Ref. | STA-3 | STA-A1 | STA-A2 | STA-A3 | STA-A4 | STA-A5 |
| IPA | 100 | 94 | 94 | 94 | 94 | 94 | 94 |
| SR 9050 | — | 6 | 3 | 3 | 2 | 2 | 2 |
| Resorcinol | — | — | 3 | — | 3 | 3 | 3 |
| Resorcinol monomethylether | — | — | — | 3 | — | — | — |
| 3-Glycidyloxypropyltrimethoxysilane | — | — | — | — | 1 | — | — |
| 3-(Meth)acryloyloxypropyltrimethoxysilane | — | — | — | — | — | 1 | — |
| 3-Mercaptopropyltrimethoxysilane | — | — | — | — | — | — | 1 |
| Total | 100 | 100 | 100 | 100 | 100 | 100 | 100 |

[STM=surface treatment agent; IPA=isopropyl alcohol]

TABLE 2

| | Tensile shear strengths on untreated or treated polymers [MPa] * | | | | | | |
|---|---|---|---|---|---|---|---|
| | Ref. | STA-3 | STA-A1 | STA-A2 | STA-A3 | STA-A4 | STA-A5 |
| PA-6 | 3 (adh.) | 5 (mixed) | 8 (coh.) | 8 (coh.) | 9 (coh.) | 9 (coh.) | 9 (coh.) |
| PA-6 poultice | 3 (adh.) | 3 (adh.) | 4 (coh.) | 5 (coh.) | 4 (coh.) | 3 (mixed) | 6 (coh.) |
| PA-6.6 | 5 (adh.) | 8 (mixed) | 10 (mixed) | 10 (mixed) | 10 (mixed) | 10 (mixed) | 10 (coh.) |
| PA-6.6 poultice | 1 (adh.) | 1 (adh.) | 5 (coh.) | 5 (coh.) | | | |
| PA-11 | 1 (adh.) | | | | | | 6 (coh.) |

* Key: adh. = adhesive fracture; coh. = cohesive fracture; mixed = mixed fracture

[STA=surface treatment agent]

The invention claimed is:

1. Surface treatment agent for aerobic (meth)acrylate systems, comprising
   one or more solvents
   one or more (meth)acrylate monomers of formula A:

A:

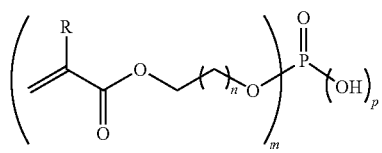

wherein R is H or a CH₃, and wherein m is an integer of 1, 2 or 3, p is an integer of 3-m, and n is an integer of from 1-15;
one or more substances of formula B:

B:

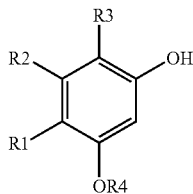

wherein R1, R2 and R3 are each H, alkyl, cycloalkyl, aryl, alkylaryl, or halogen and R4 is H, a methyl, or an ethyl group.

2. Surface treatment agent as in claim 1, wherein the solvent has a boiling point under standard conditions that is less than 130° C.

3. Surface treatment agent as in claim 1, wherein the solvent is a ketone or an alcohol.

4. Surface treatment agent as in claim 1, wherein the solvent is isopropanol.

5. Surface treatment agent as in claim 1, wherein in formula A, n is 1, 2 or 3.

6. Surface treatment agent as in claim 1, wherein in formula A, R is CH₃.

7. Surface treatment agent as in claim 1, wherein the concentration of (meth)acrylate monomers of formula A is 1-10 wt. %, calculated on the basis of the total formulation.

8. Surface treatment agent as in claim 1, wherein in formula B, R1, R2, and R3 is H or alkyl group.

9. Surface treatment agent as in claim 1, wherein in formula B, R1 and R3 is H, and R2 is H or alkyl group.

10. Surface treatment agent as in claim 1, wherein in formula B, R4 is a methyl group.

11. Surface treatment agent as in claim 1, wherein the concentration of the one or more substances of formula B is 1-10 wt. %, calculated on the basis of the total formulation.

12. Surface treatment agent as in claim 1, wherein the composition further comprises an organosilicon compound.

13. Surface treatment agent as in claim 12, wherein the concentration of the organosilicon compound is 0-2 wt. %, calculated on the basis of the total formulation.

14. Article comprised of the surface treatment agent of claim 1, wherein at least a bonding area of a surface of the article is made of an organic polymer pretreated with the surface treatment agent of claim 1.

15. Article as in claim 14, wherein the organic polymer is a polyamide selected from the group consisting of polyamide 6, polyamide 6.6, polyamide 11, polyamide 12, and mixtures thereof.

16. Adhesive system, wherein the article of claim 14 is bonded to at least one other article via an aerobic (meth)acrylate adhesive.

17. Sealant system, wherein an opening the article of claim 14 or between two or more of the articles of claim 14 is sealed against liquid or gaseous materials via an aerobic (meth)acrylate sealant.

18. A method for improving adhesion to organic polymer substrates, the method comprising applying surface treatment agent of claim 1 to at least one surface of the organic polymer substrates.

19. Surface treatment agent for aerobic (meth)acrylate systems, consisting of
   one or more solvents
   one or more (meth)acrylate monomers of formula A:

A:

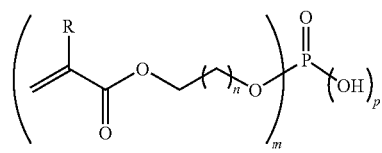

wherein R is H or a CH₃, and m wherein m is an integer of 1, 2 or 3, p is an integer of 3-m, and n is an integer of from 1-15;

one or more substances of formula B:

B:

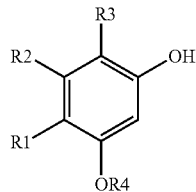

wherein R1, R2 and R3 are each H, alkyl, cycloalkyl, aryl, alkylaryl, or halogen and R4 is H, methyl group, or a ethyl group; and one or more additional (meth)acrylate monomers that have no phosphorus-containing functional groups.

20. Surface treatment agent as in claim 19, wherein the (meth)acrylate monomers having no phosphate-containing functional groups are selected from the group consisting of trimethylolpropane triacrylate, ethoxylated methacrylates, and propoxylated (meth)acrylates.

21. Surface treatment agent as in claim 19, wherein the additional (meth)acrylate monomers having no phosphorus-containing functional groups are present in a percentage in the range from 0-20 wt. %, calculated on the basis of the total formulation.

* * * * *